(12) United States Patent
Pychtin

(10) Patent No.: US 11,111,704 B2
(45) Date of Patent: Sep. 7, 2021

(54) BALL CATCH LOCKING DEVICE

(71) Applicant: Otto Ganter GmbH & Co. KG Normteilefabrik, Furtwangen (DE)

(72) Inventor: Alexander Pychtin, St. Georgen (DE)

(73) Assignee: Otto Ganter GmbH & Co. KG Normteilefabrik, Furtwangen (DE)

( * ) Notice: Subject to any disclaimer, the term of this patent is extended or adjusted under 35 U.S.C. 154(b) by 535 days.

(21) Appl. No.: 15/869,363

(22) Filed: Jan. 12, 2018

(65) Prior Publication Data

US 2018/0202205 A1 Jul. 19, 2018

(30) Foreign Application Priority Data

Jan. 13, 2017 (DE) ............... 20 2017 100 157.1 U

(51) Int. Cl.
| | | |
|---|---|---|
| *E05C 19/04* | (2006.01) | |
| *E05D 5/02* | (2006.01) | |
| *E05B 63/00* | (2006.01) | |
| *F16B 2/16* | (2006.01) | |
| *F16B 7/04* | (2006.01) | |

(52) U.S. Cl.
CPC .......... *E05C 19/04* (2013.01); *E05B 63/0056* (2013.01); *E05D 5/02* (2013.01); *F16B 2/16* (2013.01); *F16B 7/042* (2013.01)

(58) Field of Classification Search
CPC ............... E05B 63/0056; E05B 15/006; E05B 17/2011; E05B 63/121; E05B 67/365; E05C 19/04; E05C 19/009; Y10T 292/14; E05D 5/02; E05D 7/1005; E05D 2007/1033; E05D 15/0678; E05D 15/0643; F16B 2/16; F16B 7/042; F16B 21/165

USPC ......................................................... 292/252
See application file for complete search history.

(56) References Cited

U.S. PATENT DOCUMENTS

| | | | | |
|---|---|---|---|---|
| 1,965,672 A | * | 7/1934 | Seitz ...................... | E05F 5/025 16/85 |
| 2,038,835 A | * | 4/1936 | Frost ..................... | E05C 19/028 292/16 |
| 2,180,516 A | * | 11/1939 | Gehnrich ................. | C23D 9/00 292/341.15 |

(Continued)

FOREIGN PATENT DOCUMENTS

| | | |
|---|---|---|
| CN | 2043992 U | 9/1989 |
| CN | 2207427 Y | 9/1995 |

(Continued)

OTHER PUBLICATIONS

English Translation of Japanese Office Action, dated Mar. 5, 2019 in JP application No. 2018-003025.

*Primary Examiner* — Christine M Mills
(74) *Attorney, Agent, or Firm* — Browdy and Neimark, P.L.L.C.

(57) ABSTRACT

A ball catch (1) having a catch housing (26) with two spring-loaded balls (5) which are displaceable therein under spring loading, and which are supported in two oppositely situated sockets (9) of the catch housing (26) and protrude in a diametrically opposed manner into a middle receiving space (10) between the sockets (9), and a centering part (2) which with a journal (13) integrally formed thereon is insertable into the receiving space (10) and is lockable by the balls (5) at that location, wherein the ball guide (4) for the balls (5) and the compression springs (6) is inserted into the catch housing (26) as a separate part.

9 Claims, 3 Drawing Sheets

(56) References Cited

U.S. PATENT DOCUMENTS

Figure 5:
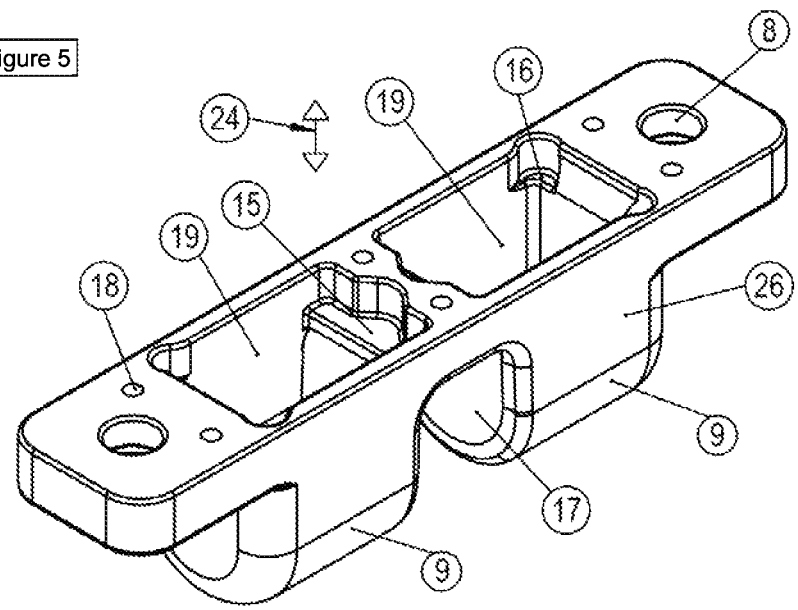

| | | | | |
|---|---|---|---|---|
| 2,465,088 A | * | 3/1949 | Gussack | E05C 17/20 217/60 C |
| 2,629,156 A | * | 2/1953 | Kamens | A44C 5/2052 24/657 |
| 2,702,719 A | * | 2/1955 | Greene, Jr. | 292/16 |
| 4,121,319 A | | 10/1978 | Welch | |
| 6,151,754 A | * | 11/2000 | Chen | E05C 17/52 16/85 |
| 7,111,360 B1 | * | 9/2006 | Hsu | E05C 19/04 16/82 |
| 7,159,910 B2 | * | 1/2007 | Hwang | D06F 39/14 292/302 |
| 7,264,284 B2 | * | 9/2007 | Hsu | E05C 19/04 16/82 |
| 8,430,435 B2 | * | 4/2013 | Juga | E05B 63/0056 292/163 |
| 2014/0361553 A1 | | 12/2014 | Sale, Jr. | |

FOREIGN PATENT DOCUMENTS

| | | | | |
|---|---|---|---|---|
| CN | 2830604 Y | | 10/2006 | |
| CN | 203271375 | | 11/2013 | |
| DE | 19911275 A1 | | 4/2000 | |
| DE | 102004030124 A1 | | 9/2005 | |
| FR | 606204 A | * | 6/1926 | ............ E05C 19/04 |
| FR | 768748 A | * | 8/1934 | ............ E05C 19/04 |
| FR | 791485 A | * | 12/1935 | ............ E05C 19/04 |
| FR | 1302574 A | * | 8/1962 | ............ E05C 19/04 |
| FR | 2642783 A1 | * | 8/1990 | ............ E04F 15/04 |
| GB | 607743 A | * | 9/1948 | ............ E05C 19/04 |
| GB | 618026 A | * | 2/1949 | ............ E05C 19/04 |
| GB | 786294 A | * | 11/1957 | ............ E05C 19/04 |
| GB | 1088284 A | * | 10/1967 | ............ E05C 19/04 |
| GB | 1245930 A | * | 9/1971 | ............ E05C 19/04 |
| GB | 2158864 A | | 11/1985 | |
| JP | 63-148780 | | 9/1988 | |
| JP | 04-018179 | | 2/1992 | |

* cited by examiner

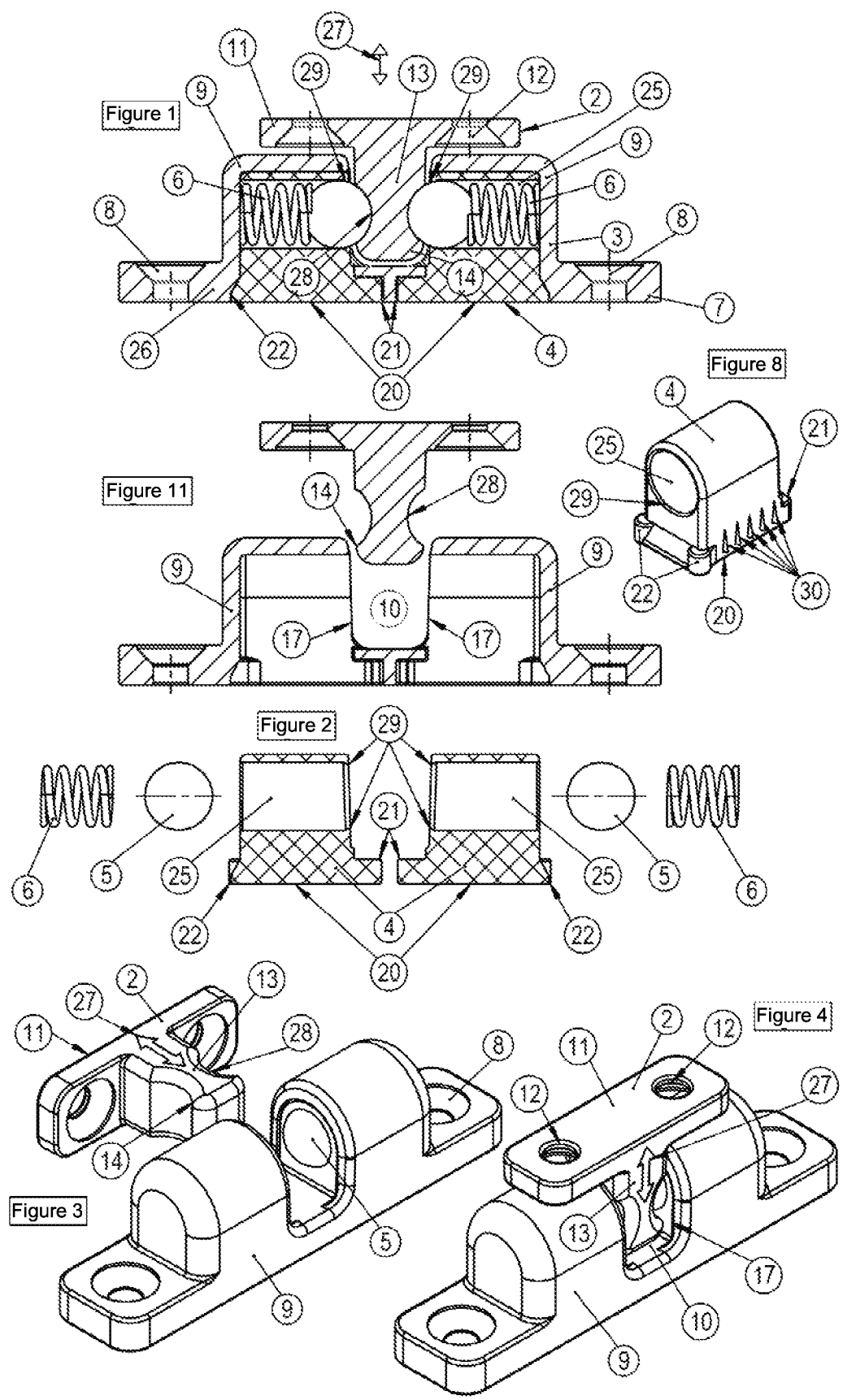

BALL CATCH LOCKING DEVICE

The subject matter of the present invention relates to a ball catch according to the preamble of Patent claim 1.

Ball catches are used as a locking device for two components that are movable relative to one another, and are disclosed in DE 199 11 275 A1, for example. The ball catch described therein is made up of a centering part with a journal integrally formed thereon, and a catch housing, the catch housing surrounding the journal and thus locking the two components together.

The components each have a rectangular, elongated mounting plate, on the end sections of which through boreholes for fastening screws are formed.

These boreholes are used for fastening the individual components to a fastening plane, for example the doors and the body of a cabinet. The catch housing is made up of two spaced-apart, mutually aligned sockets that are integrally formed on a mounting plate. The area between the sockets is used as a receiving space in which the journal of the centering part may be inserted and locked.

A ball is situated in each of the sockets, so that a total of two balls are present. The balls are situated captively but axially movably in the sockets, and extend partially into the receiving space. In each case a compression spring and an adjusting screw that closes off the socket adjoin the balls in the sockets. The compression spring is thus supported on the ball and on the adjusting screw. The pressure force of the compression spring on the ball may be adjusted with the adjusting screw. A locking force, acting in the receiving space, for the journal of the centering part which engages with the receptacle may thus be changed.

The centering part is made up of the mounting plate and the journal which is perpendicularly integrally formed on the mounting plate, and which has an essentially rectangular cross-sectional area. On the end of the journal facing away from the mounting plate, a thickened area is formed in such a way that the thickened area may be inserted into the receptacle in the first partial device, and that the balls may engage behind the thickened area and press into an adjoining projection. The centering part is thus locked to the catch housing, or vice versa.

Such devices are generally configured in such a way that the two mounting plates extend in parallel to one another. However, the centering part and the catch housing are designed in such a way that when joined, the two components may also be situated, for example, at a right angle relative to one another.

With the ball catch known from the prior art, there is the drawback that the adjusting screws of the individual compression springs are always visible from the outside. In addition, the pretensioned compression spring together with the ball fall from the housing in an uncontrolled manner when the adjusting screw is loosened and removed.

The object of the invention is to refine a ball catch of the type mentioned at the outset in such a way that its manufacture is simplified and its handling is improved.

An important feature is that the respective balls and the associated compression springs are supported in separate ball guides which are insertable from below from the direction of the fastening plane into a slot in the sockets, and from there the balls out of the sockets into the receiving space and act on the journal of the centering tongue in a diametrically opposed manner.

The ball catch according to the invention having the characterizing features of the main claim has the advantage that more flexible possibilities for use may be provided. The ball guide, which is designed as a separate insertion part, may thus be made of various materials that differ from the material of the catch housing. More cost-effective manufacture of the catch housing is thus possible, since a significant portion of the metal material may be saved.

In the event of wear, the insertion part is simply exchanged without having to replace the entire catch housing.

When the ball guide is made of a plastic material, the plastic may be provided with friction-reducing additives to ensure long-term lubrication in the guide for supporting the ball and spring which are displaceably situated there.

The separate insertion part is easily replaceable, and ball guide boreholes having various profiles may be used.

As the result of exchanging a first ball guide for a second ball guide in which the axial length of the ball guide channel is shortened, the elastic force may be permanently set to a higher pressure value without the need for an adjusting screw.

However, also providing an adjusting screw in the ball guide is not ruled out.

A further advantage is seen in that the ball together with the compression spring is easily removable, with no unsightly screws being visible. Advantageous embodiments and refinements of the invention are apparent from the subclaims.

Only one ball guide is described below, although the invention is not limited thereto. Two ball guides are preferably used for a double ball catch.

Alternatively, two contiguous ball guides may be inserted into the catch housing. These contiguous ball guides may be produced as a single component.

A ball guide does not always have to be provided; the housing may also have some other type of design, and could accommodate, for example, a female thread or the like.

The ball guide according to the invention is preferably made of plastic, although other materials such as a metal material, for example, may be used. The ball guide preferably has a cylindrical ball guide channel, designed as a through hole, in which the compression spring and the ball are accommodated. The ball guide channel has a constriction on its side facing the receiving space, with a narrowing in the diameter of the through hole. A ball that is inserted from the opposite side is held due to the constriction, which has a smaller diameter than the ball, so that only a portion of the ball surface protrudes into the receiving space. The ball is pressed against the constriction by the compression spring in order to fix a journal that is inserted into the receiving space. On the side of the open cylindrical ball guide channel opposite from the constriction, the compression spring abuts against the closed wall of the socket into which the ball guide has been inserted.

In another embodiment of the invention, it is provided that the compression spring is held by an adjusting screw on the side of the ball guide channel facing away from the receiving space, it being possible as a result of this adjusting screw to adjust the pressure force of the compression spring on the ball by screwing the screw into the receiving space. For this purpose, the ball guide is removed from the socket, the spring is adjusted, and the ball guide is inserted back into the socket.

The spring pretensioning could also take place by modifying the housing, so that an adjusting screw would not be absolutely necessary.

In another embodiment of the invention, it is provided that the cylindrical ball guide channel is open only on the side facing the receiving space, and the compression spring abuts against the side on the base of the core hole facing away from the receiving space. In this case, the ball guide is made of metal, and the constriction is achieved by compressing the cylindrical ball guide channel.

The ball guide inserted into the socket terminates in flush alignment with the underside of the flange, and thus rests on the mounting surface during installation of the catch housing. However, the invention is not limited thereto. The ball guide may also be pressed into the socket and fixed in the socket by the form-fit connection thus established, and no longer has to be supported by the mounting surface.

The ball guide has webs and tabs on its base area which engage with support surfaces, formed in recesses, on the slot in the socket, where they ensure secure supporting of the ball guide in the socket.

The subject matter of the present invention results not only from the subject matter of the individual patent claims, but also from the combination of the individual patent claims with one another.

All statements and features, in particular the spatial configuration illustrated in the drawings, that are disclosed in the documents, including the abstract, are claimed as essential to the invention, provided that, singly or in combination, they are novel with respect to the prior art.

When individual subject matter is referred to as "essential to the invention" or "important," this does not mean that this subject matter must necessarily form the subject matter of an independent claim. This is determined solely by the applicable formulation in each case of the independent patent claim.

The invention is explained in greater detail below with reference to drawings which illustrate only one implementation approach. Further important features and advantages of the invention arise from the drawings and their description.

In the drawings:

FIG. 1: shows a sectional illustration of a ball catch

FIG. 2: shows a view of the ball guide

FIG. 3: shows a perspective view of the ball catch in the opened state, with a centering part rotated by 90°

FIG. 4: shows a perspective view of the ball catch in the closed state

FIG. 5: shows a perspective view of the catch housing

Figure 6:
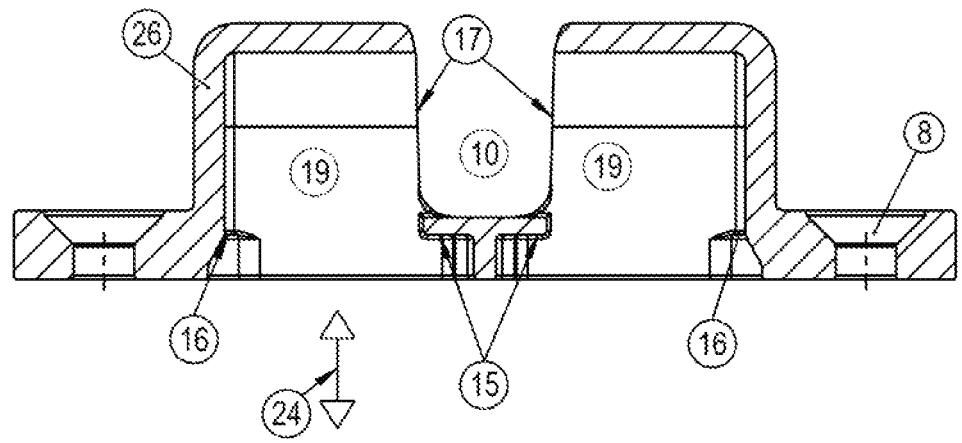

FIG. 6: shows a sectional illustration of the catch housing

Figure 7:
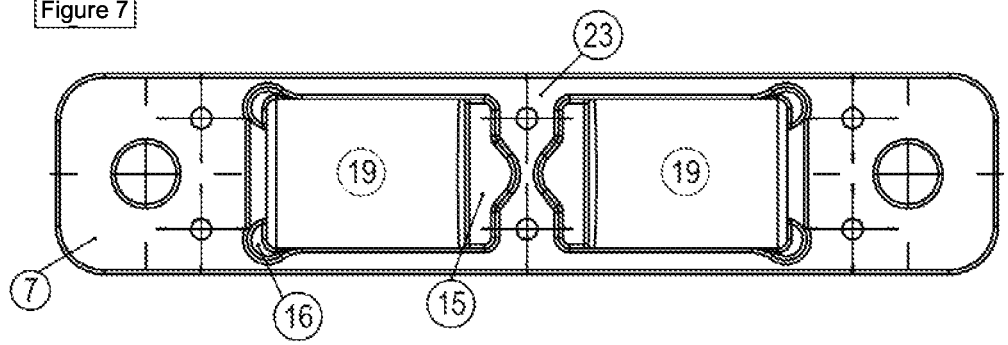

FIG. 7: shows a bottom view of the catch housing

FIG. 8: shows a perspective view of the ball guide

Figure 9:
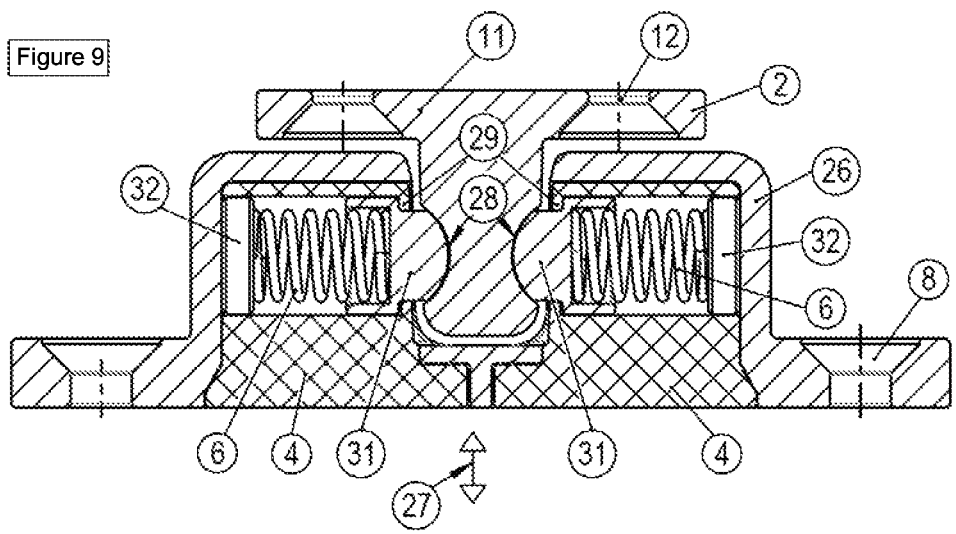

FIG. 9: shows a sectional illustration of the catch housing (pin version with adjustment capability)

Figure 10:
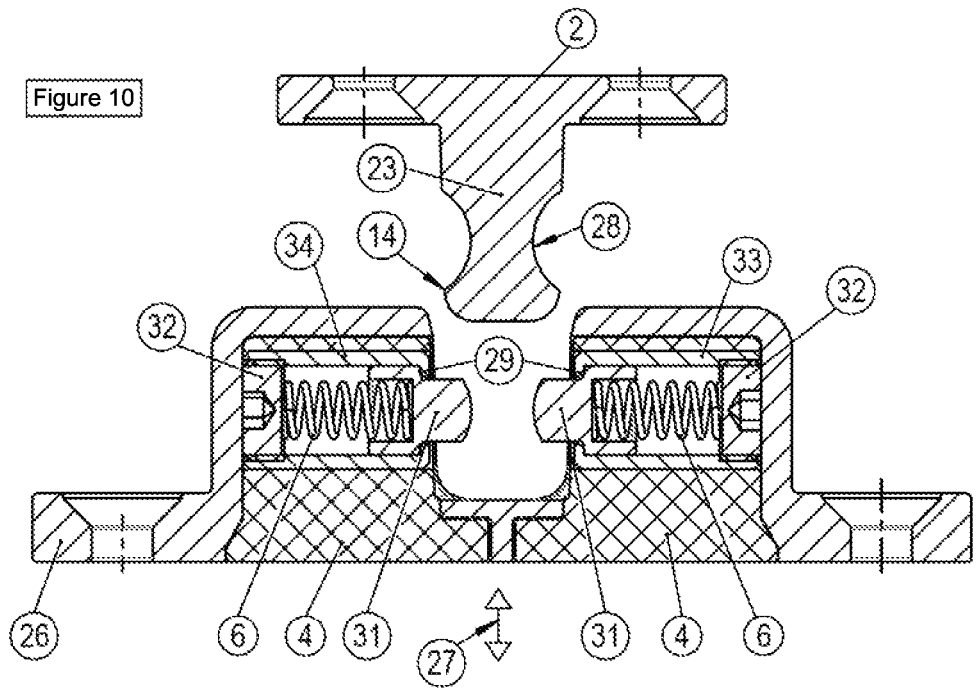

FIG. 10: shows a sectional illustration of the catch housing in a pressure fitting version in a pin design FIG. 11: shows a sectional illustration of a ball catch According to FIGS. 1 and 11, the ball catch 1 of the present invention is characterized by a centering part 2 made up of a mounting plate 11 with a journal 13 integrally formed thereon. The journal 13 has a thickened area 14 on the end facing away from the mounting plate 11. This thickened area allows the ball 5 to engage with an adjoining depression 28 behind the thickened area 14.

The centering part 2 also has boreholes 12 on its mounting plate 11 that are used for fastening the centering part 2 to a mounting surface, not shown. The centering part 2 is inserted into the catch housing 26 in the arrow direction 27.

The catch housing 26 is formed by two oppositely situated sockets 9, each having an oppositely facing window 17. In addition, the catch housing 26 has a mounting plate 7, with boreholes 8, which is integrally formed on the sockets or the housing walls 3. The boreholes 8 are used for mounting the catch housing 26 on a mounting surface, not shown.

The ball guides 4, each containing a compression spring 6 and a ball 5 in a cylindrical ball guide channel 25, are situated in the sockets 9. The ball guides 4 together with the balls 5 and the compression springs 6 are inserted into the catch housing 26 in such a way that at least one-fourth of the balls 5 protrude from the window 17 of the catch housing into the receiving space 10 of the catch housing 26. In each case a constriction 29 of the cylindrical ball guide channel 25 prevents the individual ball 5 from rolling into the receiving space 10 due to the elastic force of the compression springs 6 that act in the axial direction, since the constrictions 29 have a reduced cross section compared to the ball cross section. In this way, only a portion of the ball body protrudes into the receiving space 10 between the sockets 9.

The journal 13 of the centering part 2 is insertable into the receiving space 10 of the catch housing 26 in the arrow direction 27, and is lockable by the balls 5 which protrude into the receiving space 10.

In this design, the journal 13 may be inserted into the catch housing 26 within a range of 180°. However, it is also conceivable to implement a version that covers a smaller or larger range.

When the centering part 2 according to FIGS. 3 and 4 is now inserted into the catch housing 26 in the arrow direction 27, the balls 5 are displaced in the axial direction by the thickened area 14, and after the individual balls have passed the thickened area, slide into the adjoining depression 28 in the journal 13, behind the thickened area. The centering part 2 is thus locked in the catch housing 26.

FIG. 2 shows the ball guide 4 according to the invention, which is preferably made of a plastic body, in which a compression spring 6 and a ball 5 are mountable. The ball guide 4 also has at least one tab 22 and at least one web 21 on its base area 20. When the ball guide 4 is now inserted into the catch housing 26 in the arrow direction 24 (according to FIG. 5), the at least one web 21 and the at least one tab 22 come into contact with corresponding support surfaces 15, 16 in the catch housing 26. In this case, the at least one tab 22 rests on the support surface 16, and the at least one web 21 rests on the support surface 15.

The ball guides 4 are thus always inserted in the correct position (poka-yoke).

The socket 9 has the slot 19, which is open only at the bottom in the direction of the mounting plane, and in each case has a window 17 that allows the individual balls to protrude from the catch housing into the receiving space 10.

According to FIGS. 3 and 4, the catch housing 26 has no exterior screw connection to the sockets 9, as known according to the prior art, so that the outer sides of the sockets 9 are completely closed except for the windows 17. The ball guide 4 and the ball 5 protruding from the ball guide 4 into the receiving space 10 are apparent in the window 17.

FIG. 5 shows a perspective view of the catch housing 26 without ball guides 4 inserted, it being apparent that the catch housing 26 has a support surface 15 for supporting the web 21, and support surfaces 16 that are used for supporting the tabs 22 of the ball guide. The receiving space 10 for receiving the centering part 2 is present between the individual sockets 9. The ejection holes 18, which are used for ejecting the component from the machine in the production process, are apparent at the base surface of the catch housing.

FIG. 6 shows a sectional illustration of the catch housing 26 without the ball guide installed. The design of the support surfaces 15 in the middle area 23 of the catch housing is apparent here. This middle area 23 at the same time delimits the receiving space 10 in the direction of the mounting surface of the catch housing. The receiving spaces 19 each have oppositely situated windows 17 that allow the balls, supported in the ball guides 4, to protrude into the receiving space 10.

Accordingly, the ball guide 4, which is securely supported via tabs, webs, and press-in ribs at the receiving areas of the individual receiving spaces 19, is inserted into the catch housing 26 in the arrow direction 24.

FIG. 7 shows the bottom view of the catch housing 26 together with the flange 7. At the starting area, the slots 19 are flanked by the support surfaces 15, 16. The support surfaces 15 for the webs 21 are spaced apart from one another by the middle area 23. The support surfaces 16 at the outer corner areas of the slots 19 have a semicircular profile. A borehole 8 for fastening the catch housing to a mounting surface is provided in each of the side areas of the flange 7.

FIG. 8 shows a perspective view of the ball guide 4, with two tabs 22 and a web 21 that is integrally formed on the base surface 20, as well as the ball guide channel 25. Small press-in ribs 29 with which the ball guides 4 are securely held in the catch housing 26 are situated at the sides of the ball guides 4. The constriction 29 is also apparent.

FIG. 9 shows another embodiment of the invention, having a catch housing 26 and two spring-loaded ball pins 31 therein which are supported in two oppositely situated sockets 9 of the catch housing 26 and protrude in a diametrically opposed manner into the middle receiving space 10 between the sockets 9. Here as well, the ball guide 4 for the ball pins 31, the compression springs 6, and the adjusting screw 32 are inserted into the catch housing 26. In the embodiment shown here, the ball pin 31 is made up of a ball-shaped head part, integrally formed thereon, with which the ball pin protrudes into the receiving space 10. The compression spring 6, which presses the ball pin 31 in the direction of the receiving space 10, is supported in the ball guide 4.

FIG. 10 shows another embodiment of the invention, having a catch housing 26 and two ball pins 31 which are displaceable therein under spring loading, and which are supported in two oppositely situated sockets 9 of the catch housing 26 and protrude in a diametrically opposed manner into the middle receiving space 10 between the sockets 9. Here as well, the ball guide 4 for the ball pins 31 and the compression springs 6 is inserted into the catch housing 26 as a separate part, but the compression spring 6 and the ball pin 31 are supported in a sleeve 33 having a male thread 34 with which the sleeve is screwable into the ball guide 4. A threaded pin 32 that supports the compression spring 6 is inserted at the end of the sleeve 33 opposite from the ball pin 31. The threaded pin 32 has a hexagon socket via which the sleeve 33 may be screwed into the ball guide (4), using a tool. In the embodiment shown here, the ball pin 31 is made up of a sleeve 33 and a ball-shaped head part, integrally formed thereon, with which the ball pin protrudes into the receiving space 10. A portion of the compression spring 6, which presses the ball pin 31 in the direction of the receiving space 10, is supported in the sleeve 33. In addition, it is also conceivable that a type of system insert, i.e., a sleeve without a male thread 34, but having an integrated spring 6, threaded pin 32, and the ball pin 31, could be inserted into the ball guide 4.

The above statements always refer to a paired design; i.e., two inserted ball guides 4 are always assumed. However, it is also conceivable to implement the described embodiments only in a "one-sided" version.

That is, the elastic element is installed in only one side, and a type of guide surface would be present on the opposite side. Thus, with the elastic force that is present, the ball 5 or the ball pin 31 cannot push the journal 13, which is correspondingly formed on one side and which has the one depression 28, away to the side. One-half the force for the catch would thus naturally be expected.

When the journal 13 has an appropriately stable design, a one-sided version would also be conceivable which no longer requires a guide surface for the journal 13. Of course, a one-sided catch housing 26 would then also not be necessary.

LIST OF REFERENCE NUMERALS 1 ball catch
2 centering part
3 housing wall
4 ball guide
5 ball
6 compression spring
7 mounting plate
8 borehole
9 socket
10 receiving space
11 mounting plate
12 borehole
13 journal
14 thickened area
15 support surface
16 support surface
17 window
18 ejection hole
19 slot
20 base plate
21 web
21 tab
23 middle area
24 arrow direction
25 ball guide channel
26 catch housing
27 arrow direction
28 depression
29 constriction
30 press-in ribs
31 ball pin
32 threaded pin
33 sleeve
34 male thread

The invention claimed is:

1. A ball catch comprising a catch housing with two spring-loaded balls which are displaceable therein under spring loading, and which are supported in two oppositely situated sockets of the catch housing and protrude in a diametrically opposed manner into a middle receiving space between the sockets, and a centering part which with a journal integrally formed thereon is insertable into the middle receiving space and is lockable by the two spring-loaded balls at that location, wherein each of the sockets has a slot, which has an opening toward a fastening plane of the catch housing, the fastening plane being perpendicular to a direction of insertion of the journal into the middle receiving space, wherein two respective ball guides for the two spring-loaded balls and for two respective compression springs are inserted into the catch housing as a separate part, and each ball guide is insertable from the fastening plane of the catch housing, into the slot of one of the sockets of the catch housing, which has the opening toward the fastening plane, wherein each ball guide comprises a borehole provided as a ball guide channel.

2. The ball catch according to claim 1, wherein each ball guide is designed as a sleeve-shaped part in which the borehole, having an approximately cylindrical profile, is provided as the ball guide channel.

3. The ball catch according to claim 2, wherein a base plate is integrally formed on a sleeve body of each ball guide.

4. The ball catch according to claim 1, wherein a base area of each ball guide has at least one web that is centered on the catch housing and at least one tab that rests on corresponding support surfaces in the slot in the socket on the catch housing.

5. The ball catch according to claim 1, wherein each ball guide is pressable into the slot in the socket.

6. The ball catch according to claim 1, wherein each ball guide is made of plastic.

7. The ball catch according to claim 1, wherein each ball guide is made of metal.

8. A ball catch comprising a catch housing with two spring-loaded balls which are displaceable therein under spring loading, and which are supported in two oppositely situated sockets of the catch housing and protrude in a diametrically opposed manner into a middle receiving space between the sockets, and a centering part which with a journal integrally formed thereon is insertable into the middle receiving space and is lockable by the two spring-loaded balls at that location, wherein each of the sockets has a slot, which has an opening toward a fastening plane of the catch housing, wherein two respective ball guides for the two spring-loaded balls and for two respective compression springs are inserted into the catch housing as a separate part, and each ball guide is insertable from the fastening plane of the catch housing, into the slot of one of the sockets of the catch housing, which has the opening toward the fastening plane, wherein each ball guide has a cylindrical ball guide channel for receiving the compression spring and the spring-loaded ball, and on an end facing the middle receiving space the cylindrical ball guide channel has a constriction that has a smaller diameter than the spring-loaded ball, and that allows the spring-loaded ball to protrude only partially into the middle receiving space.

9. A ball catch comprising a catch housing with two spring-loaded balls which are displaceable therein under spring loading, and which are supported in two oppositely situated sockets of the catch housing and protrude in a diametrically opposed manner into a middle receiving space between the sockets, and a centering part which with a journal integrally formed thereon is insertable into the middle receiving space and is lockable by the two spring-loaded balls at that location, wherein each of the sockets has a slot, which has an opening toward a fastening plane of the catch housing, wherein two respective ball guides for the two spring-loaded balls and for two respective compression springs are inserted into the catch housing as a separate part, and each ball guide is insertable from the fastening plane of the catch housing, into the slot of one of the sockets of the catch housing, which has the opening toward the fastening plane, wherein small press-in ribs for laterally supporting each ball guide in the catch housing are integrally formed on sides of each ball guide.

* * * * *